United States Patent [19]

Rybicki et al.

[11] 4,305,284
[45] Dec. 15, 1981

[54] METHOD AND MEANS FOR INDICATING FLUID LEVEL BY FLUID PRESSURE

[75] Inventors: Robert C. Rybicki, Trumbull; Michael J. Marchitto, Orange, both of Conn.

[73] Assignee: The United States of America as represented by the Secretary of the Navy, Washington, D.C.

[21] Appl. No.: 116,521

[22] Filed: Jan. 29, 1980

[51] Int. Cl.³ ............................................. G01F 23/14
[52] U.S. Cl. .................................... 73/302; 73/40.5 R
[58] Field of Search ................. 73/302, 299, 301, 291, 73/40.5 R

[56] References Cited

U.S. PATENT DOCUMENTS

| | | | |
|---|---|---|---|
| 1,396,844 | 11/1921 | Huffman | 73/302 |
| 1,560,350 | 11/1925 | Seferlis | 73/302 |
| 1,981,354 | 11/1934 | Goerg | 73/299 |

*Primary Examiner*—Donald O. Woodiel
*Attorney, Agent, or Firm*—R. S. Sciascia; P. C. Lall; A. P. Durigon

[57] ABSTRACT

A method and apparatus for using pressure changes to indicate volume changes in fluid level indicators or other devices with the required degree of sensitivity and accuracy is provided. A change in fluid volume is indicated by detection and display of a concurrent pressure change in a captive volume of air.

14 Claims, 6 Drawing Figures

METHOD AND MEANS FOR INDICATING FLUID LEVEL BY FLUID PRESSURE

This invention relates to fluid level indicating devices and, more particularly, to such indicating devices wherein a pressure gauge is used to denote fluid level.

Some fluid indicating devices presently in use include an indicator rod which protrudes through a manifold, with the amount the rod extends indicating the level of fluid by direct connection to a floating piston supported by the fluid. Indicators of this type require considerable free space for rod extension as well as for viewing, present continuing sources of leakage at the indicator rod seal and the indicator piston head seal, are exposed to airborne dirt and contamination at these points, and provide inaccurate fluid level readings due to changes in fluid volume in response to environmental temperature changes among other disadvantages. The present invention avoids the deficiencies of prior devices by eliminating the upper portion of the indicator rod and the upper rod seal and providing a gas pressure indication that represents fluid level.

Accordingly, it is an object of the present invention to provide a fluid level indicating gauge that has no moving parts exposed to and extensible into the environment.

Another object of this invention is to provide a fluid level indicator that senses the pressure changes of a captured volume of gas which is responsive to changes in the volume of the monitored fluid.

A further object of this invention is to provide a fluid level indicator located remote from a vessel being monitored that indicates the fluid level or the fluid volume remaining so that filling and servicing may be performed by aircraft maintenance or other personnel prior to depletion.

A further object of this invention is to provide a fluid volume indicator system that is characterized by good sensitivity to fluid volume changes but having low sensitivity to temperature changes.

A still further object of this invention is to provide an indicator system that includes a fail-safe feature wherein indicator failure will produce a gauge showing that differs from an indication of low fluid volume.

Other objects, advantages and novel features of the invention will become apparent from the following detailed description thereof when considered in conjunction with the accompanying drawings in which like numerals represent like parts throughout and wherein.

The present invention, in general, concerns a method and means for using pressure changes to indicate volume changes in fluid level indicators or other devices with the required degree of sensitivity and accuracy. A change in accumulator oil volume in the preferred embodiment is indicated by detection and display of a concurrent pressure change in a captive volume of air by a pressure gauge adapted to indicate fluid level rather than air pressure.

The selection of the proper compression ratio in a captive volume of air or gas from empty to full is critical to proper gauge indication over the temperature range of operation. If pressures are high, small volume changes will produce relatively large pressure changes. Conversely, if pressures are low, relatively large volume changes are required to produce measurable pressure changes. Accordingly, the present invention teaches a system use of a fluid level indicating gauge connected to a chamber containing a captive volume of gas, wherein the volume of the chamber varies as a function of fluid level and in which pressure changes are generated as an inverse function of the chamber volume and are transmitted to the gauge so as to indicate fluid level. The translation of pressure changes into volume readings in the invention are accomplished by a pressure gauge adapted to read in volume and in which an initial indicating level substantially above ambient pressure is obtained by precharging a captive air volume so as to raise the gauge operating pressure to sufficiently high levels to achieve good sensitivity to volume changes. A compression ratio on the order of 3:1 is preferred for the span of fluid level from full to empty or pre-charge to provide good sensitivity to volume changes while avoiding over sensitivity to thermal expansion/contraction of accumulator oil volume and for a particular use such as in a military helicopter wherein the typical operating temperature range is from substantially $-65°$ to $160°$ F. Such a thermal change produces oil volume changes of about 10% for a typical hydraulic fluid. Since the pressure changes the indicating gauge will see, due to thermal expansion/contraction at the 3:1 ratio should be small in relation to the volume changes to be indicated for proper accumulator servicing, a substantially 50% volume change due to oil depletion has been selected as the change required to indicate the need for servicing. In a low gauge pressure embodiment, the 50% change in combination with the 3:1 compression ratio and a pre-charge substantially above ambient pressure for the captive air volume provides an appropriate degree of sensitivity for the indicator to assure its proper operation over the required temperature range. In a high gauge pressure embodiment, where increasing pressure denotes decreasing fluid volume, thermal changes are negligible.

Figure 2:
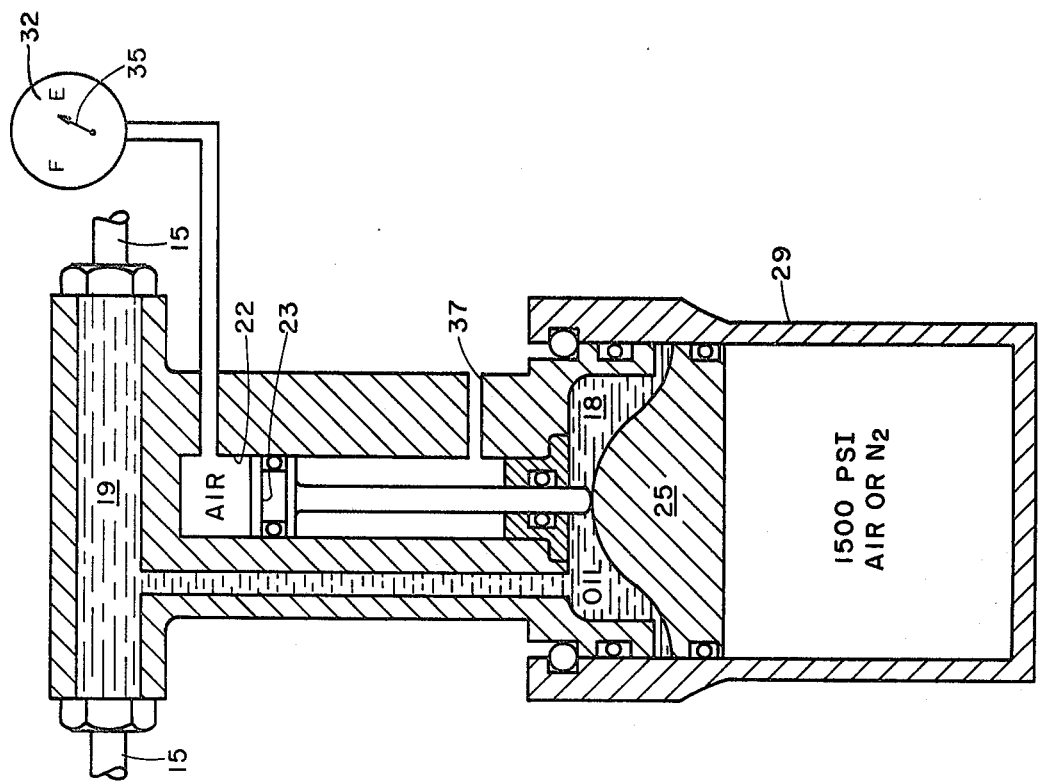
FIG. 2 is a schematic sectional view of the embodiment of FIG. 1 in a condition of low accumulator oil volume.
Figure 1:
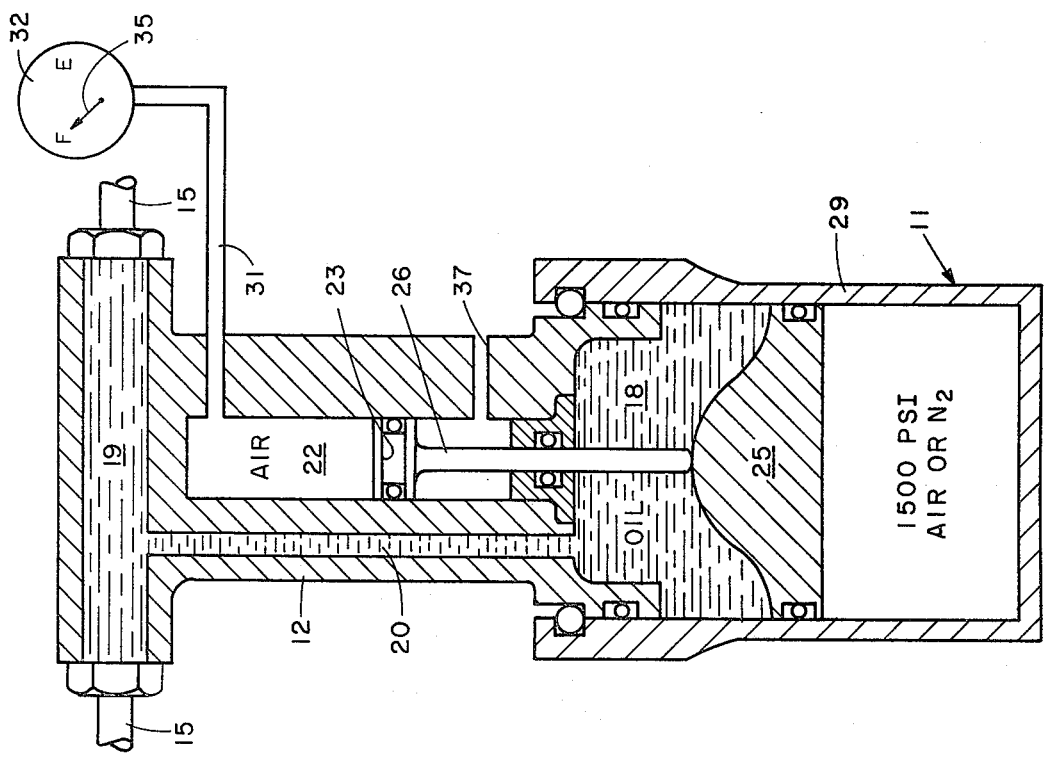
FIG. 1 is a schematic sectional view of a preferred embodiment of the invention connected to an accumulator in a normal, full condition.
Figure 3:
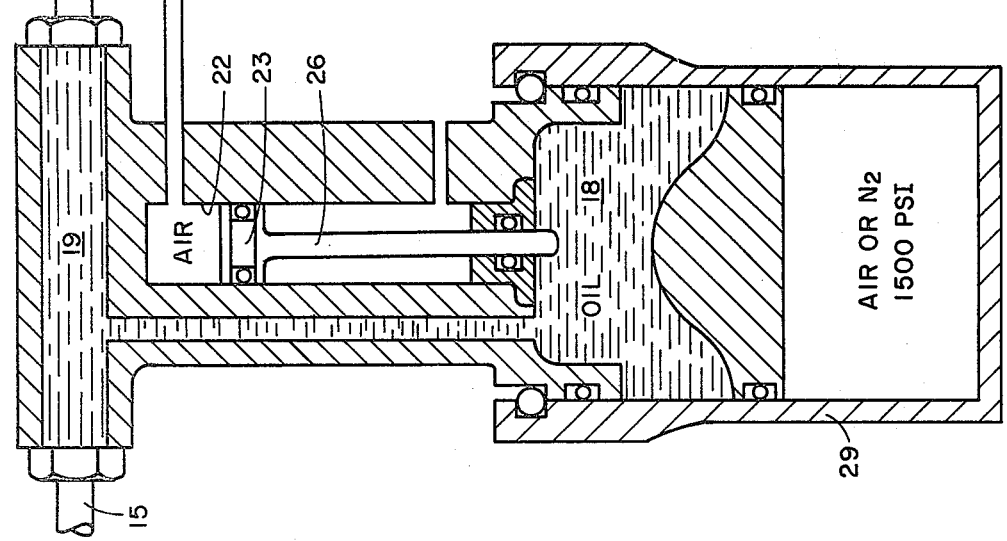
FIG. 3 is a schematic sectional view of the embodiment of FIG. 1 in a loss of pre-charge condition.

Referring to the drawings, FIG. 1 shows schematically the preferred embodiment wherein an accumulator 11 having a manifold 12 is connected via lines 15 to at least one main hydraulic cylinder, not shown, to which hydraulic fluid is supplied at a substantially constant pressure. Manifold 12 includes two spaced chambers 18 and 19 which are connected by a passage 20 and a void 22 that is formed by a piston 23 having a rod 26 that contacts a floating piston 25. Piston 25 is received in a cylinder 29 in the accumulator, with the cylinder pressurized preferably at a constant pressure of substantially 1500 psi by air, nitrogen, or other gas to maintain a constant fluid pressure in the main hydraulic cylinder or other system with which it is associated. Void 22 is connected by a pipe or tube 31 to a pressure gauge 32 to form a captive volume of gas or air whose pressure varies inversely with the volume of oil in the accumulator and the system to which it is connected. In this embodiment, low gauge pressure indicates high fluid volume and vice versa as shown by the Full and Empty positions of gauge pointer 35. The space in void 22 below piston 23 is vented at 37. In FIG. 2, the condition of minimum fluid volume is shown which causes an increased pressure or Empty indication in gauge 32. FIG. 3 illustrates the condition where there is no pre-charge over piston 23, resulting in pointer 35 resting on its stop in the counterclockwise direction far off the scale of Full to Empty indications.

Figure 5:
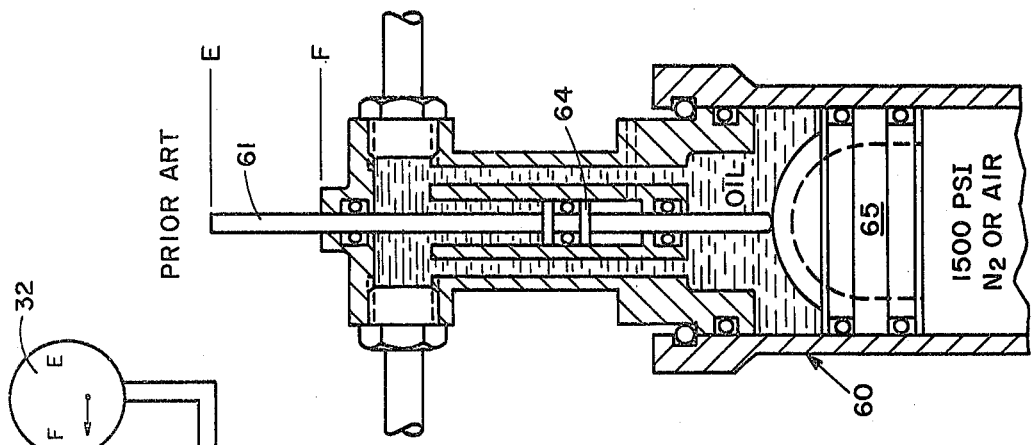
FIG. 5 is a schematic sectional view of a representative prior art device.
Figure 4:
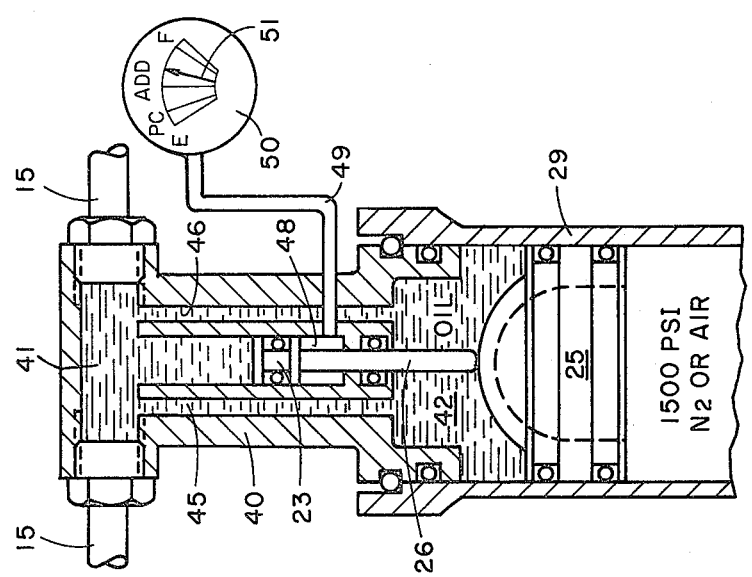
FIG. 4 is a schematic sectional view of an alternative embodiment of the invention.

FIG. 4 shows an alternate embodiment wherein a manifold 40 includes two spaced chambers 41 and 42 that are connected by a pair of passages 45 and 46 and in which chamber 41 is open centrally to permit accumulator fluid to reach piston 23. Piston 23 forms an interface between the pressurized fluid in chambers 41 and 42 whose volume is to be determined and a captive volume of gas or air in a void 48 and a pipe or tube 49 leading to a pressure gauge 50. The captive volume is selected in this embodiment to indicate full at 150 psi air or gas pressure and empty at the 50 psi air or gas pre-charge pressure by pointer 51. Cylinder 29 is pressurized as before at a constant pressure of substantially 1500 psi by nitrogen or other gas to maintain a constant fluid pressure in the main hydraulic cylinder to be supplied. FIG. 5 shows a conventional indicator 60 in which a rod 61 indicates fluid volume from Empty to Full in response to instantaneous positions of interrelated pistons 64 and 65.

Figure 6:
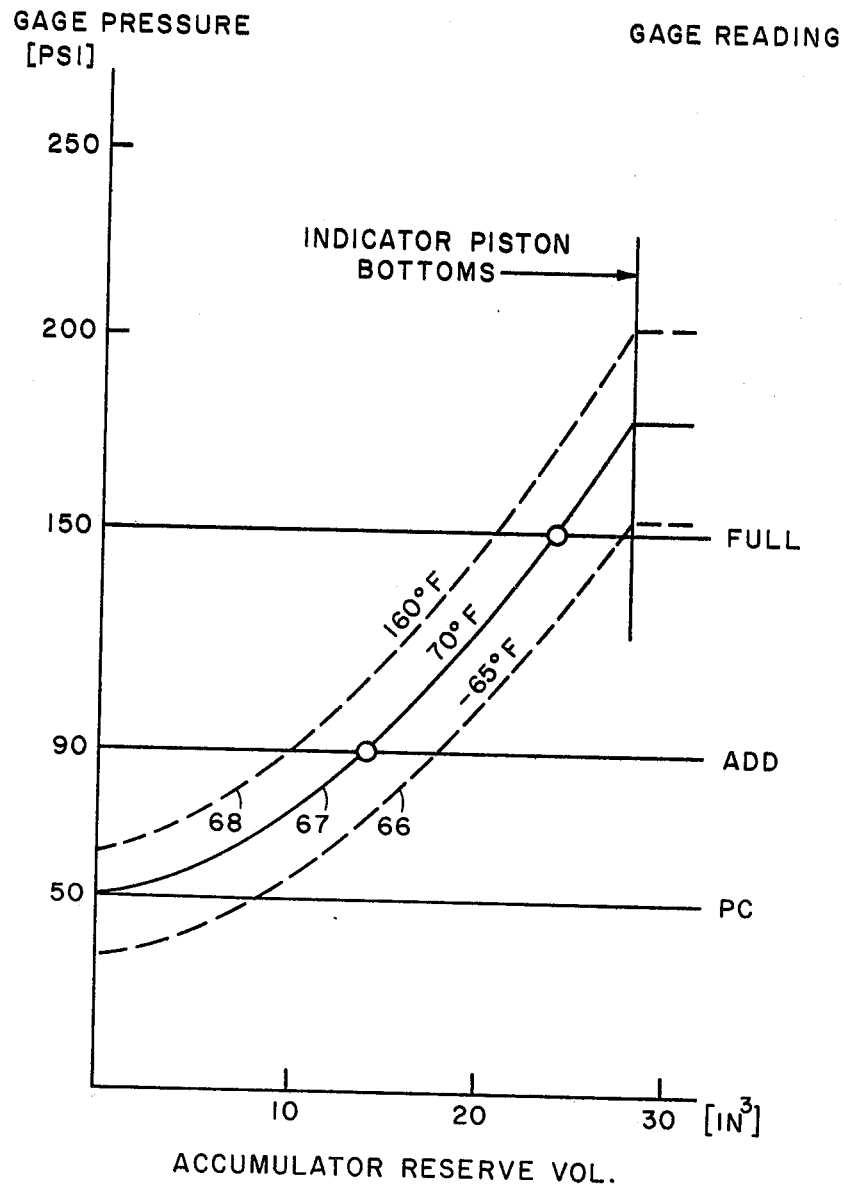
FIG. 6 is a graph illustrating the conversion of pressure to volume.

FIG. 6 illustrates the relationships between accumulator fluid reserve volume and gauge pressure for normal and for the extremes of high and low temperature. The slope of each curve is directly a function of the selected pre-charge pressure and compression ratio as related to the embodiment of FIG. 4. The abscissa represents the accumulator fluid reserve volume 18 expressed in cubic inches, available at 1500 lb/in$^2$ for supply to any connected main hydraulic cylinder. The ordinate represents gauge pressure within void 22 expressed in lb/in$^2$. Curves 66, 67 and 68 represent gauge readings for any accumulator volume at either normal or extremes of temperature. Gauge markings of FULL, ADD AND PC (pre-charge) are indicated at 150, 90 and 50 lb/in$^2$ levels respectively.

In operation, the indicator gauge in both embodiments will read accumulator fluid level in response to changes in piston 25 position. As oil is depleted through leakage or otherwise, gauge readings will increase in one embodiment and decrease in the other embodiment until an "ADD" level is reached, whereupon servicing and refilling is required. Gauge readings will vary as gas temperature varies from ambient. This variation is shown in relation to the FIG. 4 embodiment by curves 66, 67 and 68 and is on the order of ±20 psi over the full −65° to 160° F. operating temperature range. The 150 psi FULL level and the 90 psi ADD level provide a wide enough range of representative gauge readings over the temperature extremes to avoid unnecessary servicing or filling of the accumulator when gauge readings change with temperature.

The reverse acting indicator gauge of FIG. 1 reads decreasing oil reserve as gas pressure increases. This feature inherently provides for thermal compensation since as the operating temperature decreases or increases, the volume of oil in the accumulator will also decrease or increase due to thermal contraction or expansion of the fluid. The pressure in the captive volume of air will also decrease or increase for similar reasons, producing a respective pressure increase or decrease in the gauge due to the constant pressure on the outer surface of piston 25. Thus, the gauge in this embodiment will read correct oil volume regardless of temperature. These two tendencies for pressure changes with temperature are always opposite so that thermal compensation is always provided regardless of temperature and whether an increase or decrease is involved.

Fail-safety of the indicator system is provided by vent 37 since leaking accumulator oil will be vented to the atmosphere, and gauge failure is indicated by loss of pre-charge and an off-the-scale reading. A 500 psi pre-charge is required in this embodiment to assure that piston rod 26 is kept in contact with piston 25.

With reference to FIG. 4, as oil is pumped into the accumulator or other reservoir, arm or pointer 51 will move right, toward and to the Full level. As oil is depleted, pointer 51 will move left to the ADD line whereupon oil must then be added until the pointer reads FULL again. These indications are true values regardless of the temperature of the oil since at low temperatures the oil volume in the system will be reduced due to thermal contraction requiring oil to be added until the gauge reads Full again, while under warm weather conditions, thermal expansion will increase the volume of oil in the system causing an overfull indication which is tolerable and requires no corrective action. Thus, a complete reserve of oil can be maintained for operation in cold weather, and the accumulator system is adapted to accomodate an extra volume of oil for high temperature operation as evidenced by pointer overtravel to the right of the Full line. A gauge is selected whose proof pressure is well above the anticipated overtravel at the high temperatures expected to be encountered.

Oil pressure from the main fluid cylinder chamber substantially exceeds the gas pressure in the captive volume and, therefore, always maintains contact between rod 26, piston 23 and floating piston 25 as in the prior art device, however, the contacting force is much greater in the present invention because of the larger piston area, and because airborne dirt and contamination no longer affect the seal of piston 23, which might result in increased frictional resistance to piston movement. The 50 psi pre-charge also provides fail-safe indication for gauge 50 so that in normal operation the gauge pressure cannot go below 50 psi even if accumulator 11 were empty. If, however, the gauge or the captive air chamber leaks, the pre-charge will be lost and the gauge will read below the PC level providing a positive indication of a failed indicator system rather than a low oil indication.

What is claimed is:

1. Apparatus for automatically indicating both the level or quantity of liquid in an accumulator, or other pressurized container, and indicator failure in a manner that differs from low liquid volume indications comprising:

an accumulator having a closed liquid system connected thereto and means for pressurizing said accumulator and said system at a substantially constant pressure;

means in said accumulator actuated by said liquid for forming a void therein;

a pressure gauge and means connecting said pressure gauge to said void to form a closed volume; and a gas in said volume at a selected pre-charge pressure so that pressure changes in said liquid cause pressure changes in said gas which are indicated by said gauge as changes in the volume of said liquid.

2. The apparatus as defined in claim 1 wherein the volume of said void is increased upon decrease in volume of said liquid.

3. The apparatus as defined in claim 2 wherein a compression ratio on the order of 3:1 is established at pre-charge between said system liquid pressure and the pressure of the gas in said void to provide good sensitivity to volume changes.

4. The apparatus as defined in claim 3 wherein said liquid and gas volumes are selected so that a substantially 50% volume change due to liquid depletion will provide an indication of need for servicing.

5. The apparatus as defined in claim 1 wherein the volume of said void is decreased upon decrease in volume of said liquid.

6. The apparatus as defined in claim 5 wherein a compression ratio on the order of 3:1 is established at pre-charge between said system liquid pressure and the pressure of the gas in said void to provide good sensitivity to volume changes.

7. The apparatus as defined in claim 6 wherein said liquid and gas volumes are selected so that a substantially 50% volume change due to liquid depletion will provide an indication of need for servicing.

8. A method of fluid level indicating comprising:
containing a captive volume of a gas by constraining means actuated by the pressure applied to a fluid whose level in a chamber is to be monitored;
combining the captive volume with that of a conduit to a pressure gauge so that the pressure gauge will sense the pressure of gas in said combined captive volume;
pre-charging in the gas in said combined captive volume to a pressure selected so that good sensitivity to volume changes is obtained; and
adapting the pressure gauge to continually indicate the level of fluid in said chamber,
whereby changes in the level of the pressurized fluid are obtained by means that do not extend into and are sealed from the environment.

9. The method of claim 8 wherein decreasing fluid volume increases the pressure of the captive volume so that high pressure gauge readings denote low fluid volume.

10. The method of claim 8 wherein decreasing fluid volume decreases the pressure of the captive volume so that low pressure gauge readings denote low fluid volume.

11. A system for using a variable gas chamber volume to indicate changes in the level of fluid in an associated pressurized fluid chamber comprising:
a pressurized cylinder and a manifold corrected thereto for containing a portion of a fluid under a selected pressure;
means for maintaining said pressure including a floating piston in said cylinder and means for maintaining gas under pressure against one surface of said piston,
said manifold having at least one passage communicating with said cylinder for admitting fluid to said cylinder on the opposite side of said piston from said one surface,
said manifold having a sealed volume and a piston in said volume having a rod extending in sealed relationship through said manifold to and contact said opposite side of said cylinder piston so that cylinder piston movement is communicated to said manifold piston;
a pressure gauge and conduit means connecting said pressure gauge to said volume; and
means for pre-charging said conduit means and said volume to a selected pressure in relation to the pressure of said gas so that good sensitivity to volume changes are obtained in said pressure gauge,
whereby changes in the level of the pressurized fluid are indicated at said pressure gauge by means that do not extend into and are sealed from the environment.

12. The system as defined in claim 11 wherein said manifold piston alone acts upon said volume and decreasing fluid volume increases the pressure in said volume so that high pressure gauge readings denote low fluid volume.

13. The system as defined in claim 12 wherein the volume in said manifold surrounding said manifold piston rod is vented to atmosphere to provide for discharge of leaked fluid and greater accuracy due to removal of back pressure.

14. The system as defined in claim 11 wherein said volume is a central bore through said manifold so that the outer area of said manifold piston is exposed to said pressurized fluid and the inner area of said manifold piston defines said selected volume,
whereby decreasing fluid volume decreases the pressure of the sealed volume so that low pressure gauge readings denote low fluid volume.

* * * * *